(12) United States Patent
Kobayashi et al.

(10) Patent No.: US 9,746,855 B2
(45) Date of Patent: Aug. 29, 2017

(54) INFORMATION PROCESSING SYSTEM, METHOD, AND PROGRAM

(71) Applicant: CANON KABUSHIKI KAISHA, Tokyo (JP)

(72) Inventors: Kazuhiko Kobayashi, Yokohama (JP); Masahiro Suzuki, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 14/013,346

(22) Filed: Aug. 29, 2013

(65) Prior Publication Data

US 2014/0067317 A1    Mar. 6, 2014

(30) Foreign Application Priority Data

Sep. 3, 2012 (JP) .................................. 2012-193369

(51) Int. Cl.
*B25J 9/16* (2006.01)
*G05D 3/00* (2006.01)

(52) U.S. Cl.
CPC .............. *G05D 3/00* (2013.01); *B25J 9/1697* (2013.01); *G05B 2219/37567* (2013.01); *G05B 2219/40604* (2013.01)

(58) Field of Classification Search
CPC ...................................................... G06K 9/36
USPC ......... 702/92, 135, 141, 150, 152, 153, 158, 702/159; 345/633; 348/135; 700/1
See application file for complete search history.

(56) References Cited

U.S. PATENT DOCUMENTS

| 8,320,709 | B2 * | 11/2012 | Aratani ................ G06K 9/3216 345/633 |
| 9,026,234 | B2 * | 5/2015 | Suzuki ................... B25J 9/1669 700/1 |
| 2002/0175994 | A1 * | 11/2002 | Sakakibara ............ G01B 11/24 348/135 |

(Continued)

FOREIGN PATENT DOCUMENTS

| JP | 2000288974 A | 10/2000 |
| JP | 3556589 B2 | 8/2004 |
| JP | 2008087074 A | 4/2008 |

*Primary Examiner* — Gregory J Toatley
*Assistant Examiner* — Felix Suarez
(74) *Attorney, Agent, or Firm* — Canon U.S.A., Inc. IP Division

(57) ABSTRACT

An apparatus is provided with a first sensor unit that obtains two-dimensional information or three-dimensional information about a target object with a first position and orientation, a second sensor unit that obtains the two-dimensional information about the target object, a three-dimensional position and orientation measurement unit that measures three-dimensional position and orientation of the target object based on the information obtained by the first sensor unit, a second sensor position and orientation determination unit that calculates second position and orientation based on a measurement result with the three-dimensional position and orientation measurement unit and model information about the target object, and a three-dimensional position and orientation measurement unit that measures the three-dimensional position and orientation of the target object based on the information obtained by the second sensor unit with the second position and orientation and the model information about the target object.

10 Claims, 7 Drawing Sheets

(56) References Cited

U.S. PATENT DOCUMENTS

2013/0158947 A1  6/2013 Suzuki

* cited by examiner

FIG.3D

| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |

FIG.3E

| LINE | TWO POINTS AT BOTH ENDS |
|---|---|
| L1 | P1,P2 |
| L2 | P2,P3 |
| L3 | P3,P4 |
| L4 | P1,P4 |
| L5 | P2,P6 |
| L6 | P3,P7 |
| L7 | P4,P8 |
| L8 | P1,P5 |
| L9 | P5,P6 |
| L10 | P6,P7 |
| L11 | P7,P8 |
| L12 | P5,P8 |

FIG.3F

| SURFACE | LINES ENCLOSING SURFACE | NORMAL LINE (x,y,z) |
|---|---|---|
| S1 | L1,L2,L3,L4 | (0,0,-1) |
| S2 | L1,L5,L8,L9 | (-0.88,0.12,0) |
| S3 | L2,L5,L6,L10 | (0,1,0) |
| S4 | L3,L6,L7,L11 | (0.88,0.12,0) |
| S5 | L4,L7,L8,L12 | (0,-1,0) |
| S6 | L9,L10,L11,L12 | (0,0,1) |

CORRESPONDING
POINT (EDGE)
504

502 CONTROL
POINT

503
SEARCH
LINE

501
PROJECTED
LINE SEGMENT

TEMPERATURE
GRADIENT

505

505

SEARCH LINE

INFORMATION PROCESSING SYSTEM, METHOD, AND PROGRAM

BACKGROUND OF THE INVENTION

Field of the Invention

The present invention relates to an information processing system for controlling a movable unit including a movable portion capable of changing an position and a orientation and a method, a program, and a computer-readable storage medium therefor.

Description of the Related Art

With recent progress in robot technology, robots are beginning to perform complicated tasks, instead of people, which had been performed by people in the past such as assembling of industrial products. Such robot performs an assembling process by picking up a component using an end effector such as a hand.

In the past, components which are to be picked up are supplied by utilizing an apparatus, which is called a parts feeder, for supplying components by arranging each of the components one by one or by stacking components in a pallet (a box) in various orientations. When a part feeder is used, each of the components is supplied in such a manner that the position and the orientation of each of the components are determined in advance, and therefore, a robot can relatively easily pick up the components. However, preparing a parts feeder apparatus requires an additional cost. Moreover, in some cases, it may be necessary to prepare different parts feeders which are suitable for shapes of the components. On the other hand, when the components are supplied as being stacked, the components are simply placed on a pallet, and this can avoid the increase of the cost. Further, in response to the tendency of wide-variety and small-lot production in recent years, the method for supplying components in a stacked manner, which can cope with various types of components in a short time, attracts attention.

For example, as a technique about picking of a stacked component using a robot and image sensors, the publication of Japanese Patent No. 3556589 discusses a method for picking up a component using a combination of operations of a plurality of sensors and a robot.

When a stacked component is picked up accurately, it is necessary to correct a relative positional relationship with the component before the position where the component is grabbed. This is because an operation accuracy of a multi-axial robot with absolute position designation is low, and occlusion may occur in which one of the sensors cannot observe the component, and thus, the accuracy at the position where the component is grabbed cannot be ensured. Therefore, it is necessary to observe the component at the position where the robot grabs the component.

In the publication of Japanese Patent No. 3556589, a sensor for obtaining three dimension includes an apparatus for emitting a pattern onto a housing to ensure a baseline and an apparatus for capturing an image, and accordingly, the sensor is large and its weight is heavy. Therefore, the weight of the sensor is added to a load capacity of an arm portion of the robot, and increases the inertia during movement. As a result, a robot with a higher degree of rigidity is required, which increases the cost.

SUMMARY OF THE INVENTION

According to an aspect of the present invention, an information processing system includes a first sensor arranged separately from a movable unit and configured to obtain two-dimensional information or three-dimensional information about a target object with a first position and orientation, a second sensor unit attached to the movable unit and configured to obtain the two-dimensional information about the target object, a first measurement unit configured to measure three-dimensional position and orientation of the target object based on the information obtained by the first sensor unit, a second sensor position and orientation determination unit configured to calculate second position and orientation with which the second sensor unit obtains information based on a measurement result of the first measurement unit and model information about the target object, and a second measurement unit configured to measure the three-dimensional position and orientation of the target object based on the information obtained by the second sensor unit with the second position and orientation and the model information about the target object.

Further features of the present invention will become apparent from the following description of exemplary embodiments with reference to the attached drawings.

BRIEF DESCRIPTION OF THE DRAWINGS

FIGS. 3A to 3F illustrate a three-dimensional geometric model.

DESCRIPTION OF THE EMBODIMENTS

Various exemplary embodiments, features, and aspects of the invention will be described in detail below with reference to the drawings.

According to a first exemplary embodiment, a first sensor unit (a projector and a camera) for obtaining three-dimensional information about a target object and a second sensor unit (a camera) which is attached to a robot and for obtaining two-dimensional information about the target object are used to measure three-dimensional position and orientation of the target object.

Figure 1:
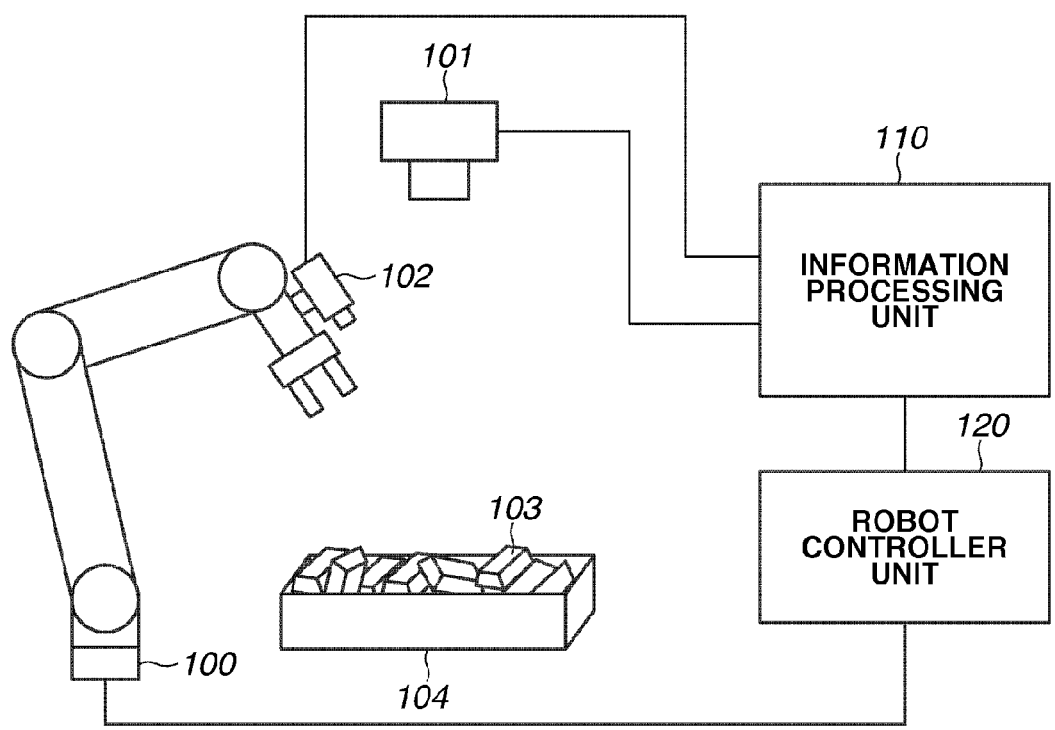
FIG. 1 illustrates a configuration of a control system of a robot according to a first exemplary embodiment.

FIG. 1 illustrates a configuration of a control system of a robot according to the first exemplary embodiment. As illustrated in FIG. 1, the control system is provided with a robot 100 and an information processing system including a first sensor unit 101, a second sensor unit 102, an information processing unit 110, and a robot controller unit 120. With this configuration, a target object 103 stacked in a pallet 104 is measured, and the robot 100 performs pickup operation.

The robot 100 which is a movable unit including a movable portion capable of changing a position and an orientation is an articulated robot, and operates upon receiving a control command from the robot controller unit 120. A hand which is an end effector is attached to the end of the robot 100, and can perform an operation on the target object 103. According to the present exemplary embodiment, a hand having a chuck mechanism capable of holding a target object is used as the end effector. Alternatively, the end effector may be a hand that can be driven with a motor, or a suction pad for sucking a target object using an air pressure. Calibration work of the position and the orientation of the sensor unit 101, the position and the track of the robot 100 and the hand, and relative position and orientation of the arm of the robot 100 and the sensor unit 102 are considered to be done in advance according to a conventional technique before the present exemplary embodiment is carried out. Accordingly, the robot 100 can be controlled so that the hand is set from a coordinate system of the position and the orientation which are output from the information processing unit 110 to a position and an orientation designated by a workspace coordinate system.

The first sensor unit 101 includes a projector and a camera for capturing a two-dimensional image. The first sensor unit 101 is arranged at a first position and orientation above the pallet 104 in a fixed manner, and the first sensor unit 101 captures an image of the target object 103 stacked, and outputs a distance image and a two-dimensional image thereof to the information processing unit 110. A relative positional relationship between the projector and the camera of the first sensor unit 101 is obtained in advance by calibration. According to the present exemplary embodiment, the first sensor unit 101 performs image processing on the captured image and outputs as a distance image. However, the information processing unit 110 may be provided with an image processing mechanism to convert the image into a distance image.

The projector of the first sensor unit 101 emits a pattern light onto the target object 103, causes the camera of the first sensor unit 101 to capture the pattern, and calculates a distance by the triangular method based on a correspondence between the emitted pattern and the captured pattern. As a pattern, a plurality of stripe patterns of different widths according to the spatial coding method, a plurality of line patterns, and the like may be used. Alternatively, a two-dimensional pattern or a random dot pattern may be used.

The first sensor unit 101 may include a diffraction grating, an illumination, and a camera. In this case, a pattern light is projected onto the target object using the diffraction grating and the illumination, and the camera captures the pattern. The emission of the pattern light is not limited to the projector. Instead, an image may be obtained by scanning laser slit light. Still alternatively, a mechanism for measuring a reflection time of light and generating a distance image may be used. The emission of the pattern light is advantageous when an object having less patterns on its surface such as an industrial component is adopted as the target object. When there is much patterns thereon, a stereo camera using two cameras may be used which can generate a distance image from a region corresponding to both of the captured images.

The second sensor unit 102 includes a small camera for capturing a two-dimensional image. The second sensor unit 102 is attached to a portion near the hand of the robot 100 in a fixed manner, and measures an object near the end effector with a second position and orientation that can be controlled by an angle of each joint of the robot 100. A relative positional relationship between the camera of the second sensor unit 102 and the end effector which is the robot coordinate system is obtained in advance by calibration. According to the present exemplary embodiment, an image captured by the second sensor unit 102 is processed by the information processing unit 110. However, an image processing mechanism may be provided within the second sensor unit 102 to output a result of image processing.

The target object 103 is a component constituting an industrial product, and is picked up by the robot 100 and assembled with the product. Materials thereof may be various things such as plastic, metal, and vinyl. A plurality of target objects 103 is stacked on the pallet 104 in various orientations.

The pallet 104 is a box for accommodating the target objects 103. The material of the pallet 104 is not particularly limited, and in many cases, plastic and paper material are used. The shape is not also particularly limited, and the pallet 104 is often in a cubic or a rectangular solid shape from the view point of ease of manufacturing. The size is not also particularly limited, and generally, the size is within a range that can be measured with the sensor unit 101.

Figure 2:
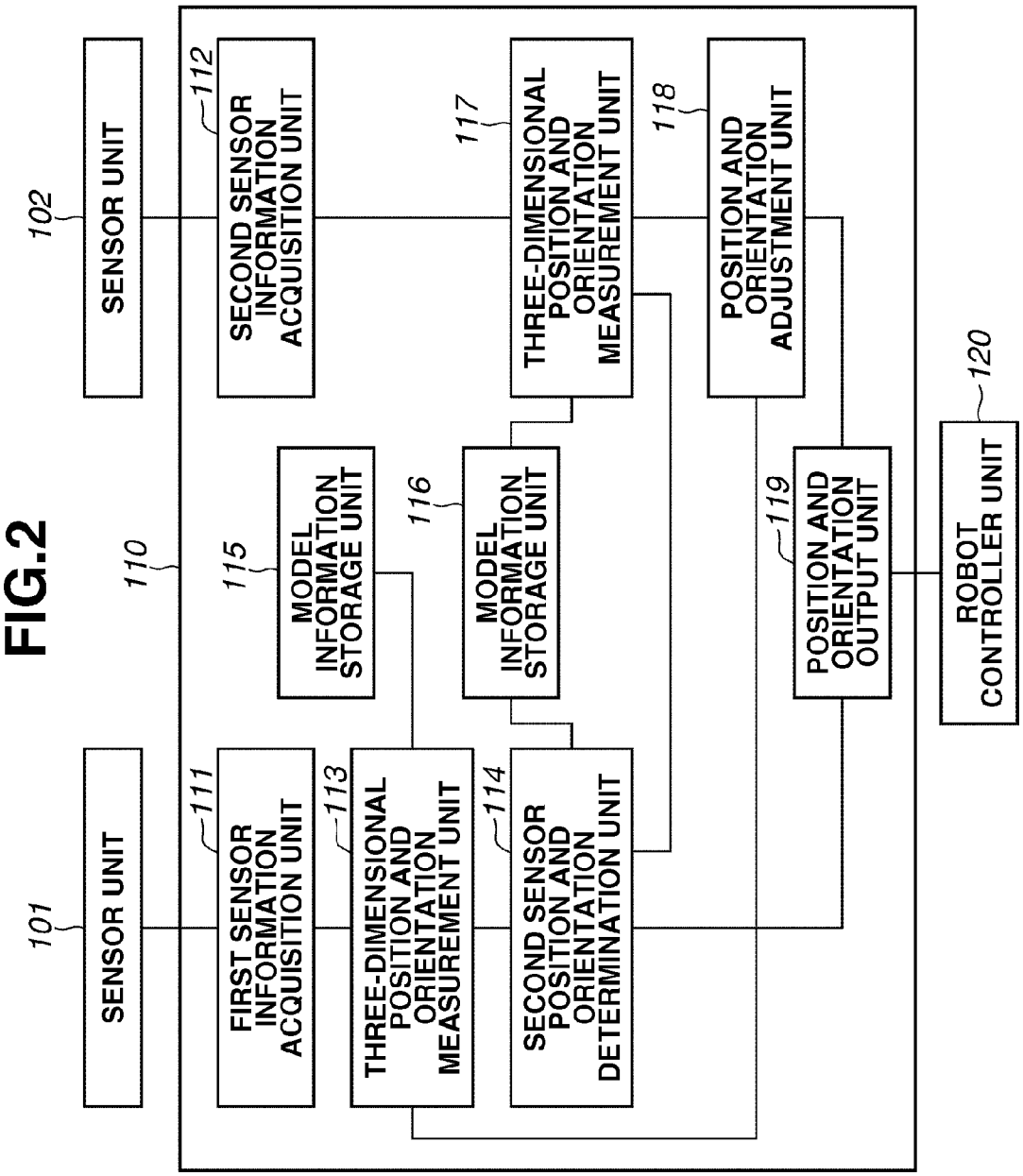
FIG. 2 illustrates a configuration of an information processing unit.

Subsequently, the configuration of the information processing unit 110 will be described. FIG. 2 illustrates the configuration of the information processing unit 110.

A first sensor information acquisition unit 111 obtains the distance image and the two-dimensional image captured by the first sensor unit 101, and outputs the obtained images to a three-dimensional position and orientation measurement unit 113.

A model information storage unit 115 stores measurement model information to be used by the three-dimensional position and orientation measurement unit 113 to measure the position and the orientation of the target object. As a piece of information, the measurement model information includes a three-dimensional geometric model based on the three-dimensional computer aided design (CAD). Another piece of information, the measurement model information includes a reference image model obtained by observing a three-dimensional geometric model imitating a target object or a real target object from a plurality of viewpoints determined in advance.

Figure 3A:
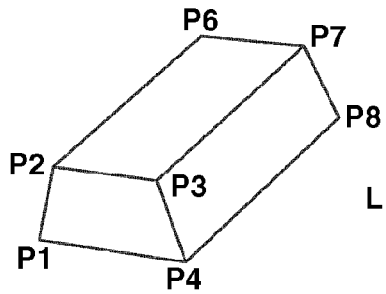
Figure 3B:
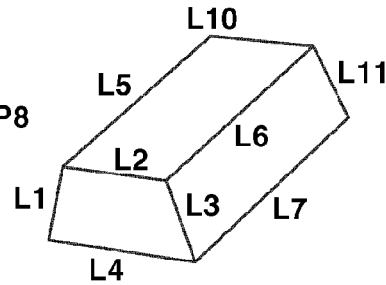
Figure 3C:
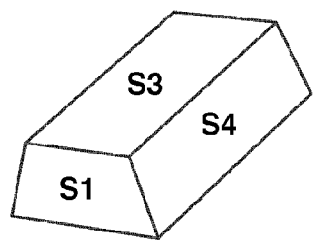

The three-dimensional geometric model is a CAD model itself that can be treated by three-dimensional CAD software or a model that is obtained by converting a three-dimensional CAD model into a plurality of polygon elements used in a computer graphics field. In the present exemplary embodiment, a case where polygon elements are used will be described. As illustrated in FIGS. 3A to 3F, a model includes constituent elements such as points, lines, and surfaces. Models illustrated in FIGS. 3A to 3C are all the same. FIGS. 3A and 3D are a figure and a table of each apex of the model. FIGS. 3B and 3E are a figure and a table of lines of sides of the model. FIGS. 3C and 3F are a figure and a table of each surface of the model. The model includes normal line data of a surface constituting the model as illustrated in FIG. 3F.

The reference image model is data including a plurality of two-dimensional images. The reference image model based on actually captured images is generated from images obtained by capturing images of the target object by the camera from various directions around the target object. To captures images, a scaffold may be assembled and a plurality of cameras may be arranged thereon, or a person may hold a camera with his/her hand to take pictures, or a camera attached to the robot may captures images while the robot is moved. Images may be captured by any method, but relative position and orientation between the target object and the camera that took the images is obtained, and the relative position and orientation as well as the captured image are stored together. When a plurality of cameras is arranged on the scaffold, the relative position and orientation can be obtained from the shape of the scaffold. When a person holds a camera, the relative position and orientation can be obtained by attaching a position and orientation sensor to the camera. When images are captured with a camera attached to the robot, the relative position and orientation can be obtained using the control information about the robot.

The reference image model based on the three-dimensional geometric model simulating the target object is obtained from an image captured when the camera faces the center of a CAD model from an apex of a geodesic sphere when the geodesic sphere is set so that the apex is at the same distance from the center of the CAD model. There is a plurality of apexes of the geodesic sphere, and apexes adjacent to each other are at the same distance. The image as well as information about the observation direction as to from which direction the image is seen based on the relative relationship with another apex using a certain apex set as a reference position are stored as setting information.

When it is known in advance that there is only one type of the target object, only the measurement model information about that type is stored. When a plurality of types of target objects are treated, a plurality of pieces of measurement model information are stored, and are switched when used.

The three-dimensional position and orientation measurement unit 113, which is a first measurement unit, obtains the position and the orientation of the target object 103 using the distance image and the two-dimensional image which are output from the first sensor information acquisition unit 111 and the measurement model information stored in the model information storage unit 115. Then, the position and orientation information thus obtained is output to a second sensor position and orientation determination unit 114.

When the three-dimensional geometric model is used as the measurement model information, the position and the orientation of the target object are obtained by associating a line which is a side of the three-dimensional geometric model and an edge component extracted from the two-dimensional image which is output from the first sensor information acquisition unit 111. According to the present exemplary embodiment, approximate values of the position and the orientation of the measurement target object are repeatedly corrected by the iterative operation so that the three-dimensional geometric model corresponds to the two-dimensional image.

The exemplary embodiment uses a method for estimating the position and the orientation of the model from the relationship with corresponding geometric features included in the image using the measurement model information. Hereinbelow described is a method using a method for adjusting the position using the two-dimensional image from the correspondence between a line segment in the three-dimensional geometric model and an edge in the image and a method for estimating the position and the orientation to minimize a distance between the surface of the model and a corresponding distance point group included in the distance image. Alternatively, when the two-dimensional image is used, it may be possible to use, e.g., a method based on pixel comparison by template matching and a method based on geometric feature point correspondence for making association using a gradient feature of a texture as geometric feature. In these methods, models obtained by observing the target object from various directions are stored for each viewpoint, and the model of the corresponding observation viewpoint is referred to, so that the position and orientation can be obtained.

When the reference image model is used as the measurement model information, a reference image of the highest degree of match based on the template matching using the reference image model as a template is obtained, and based on the position and orientation information about the target object associated with the reference image, the position and the orientation of the target object is obtained.

When the three-dimensional geometric model is used as the measurement model information, the position and the orientation of the target object are obtained by associating point group data of the surface extracted from the three-dimensional geometric model and the distance point group extracted from the distance image which is output from the first sensor information acquisition unit 111. According to the present exemplary embodiment, the iterative closest point (ICP) method is used to obtain the position and the orientation of the target object using the distance point group and the measurement model information. The position and the orientation of the target object are repeatedly corrected by the iterative operation. It is noted that the method for obtaining the position and the orientation of the target object is not limited to the ICP method.

The position and the orientation obtained by the three-dimensional position and orientation measurement unit 113 are output to the second sensor position and orientation determination unit 114 and a position and orientation adjustment unit 118.

The second sensor position and orientation determination unit 114 obtains a second position and orientation where the second sensor unit 102 measures the target object 103 based on the position and the orientation of the target object 103 obtained by the three-dimensional position and orientation measurement unit 113. At this occasion, the second sensor unit 102 is moved to a position and orientation which is suitable for the measurement model information used in the image-capturing coordinate system of a three-dimensional position and orientation measurement unit 117. The position and orientation information is output to a position and orientation output unit 119. In addition, the position and orientation is used as an initial value of the three-dimensional position and orientation measurement unit 117. A method for obtaining the position and the orientation where the second sensor unit 102 measures the target object 103 will be described below.

A second sensor information acquisition unit 112 obtains the two-dimensional image captured by the second sensor unit 102, and outputs the obtained two-dimensional image to the three-dimensional position and orientation measurement unit 117.

The three-dimensional position and orientation measurement unit 117, which is a second measurement unit, obtains the position and the orientation of the target object 103 using the two-dimensional image which is output from the second sensor information acquisition unit 112 and measurement model information stored by a model information storage unit 116. Then, the position and orientation information thus obtained is output to the position and orientation adjustment unit 118.

The position and orientation adjustment unit 118 unifies the output information pieces, in view of the accuracy of estimation of parameters, as an estimation result of the three-dimensional position and orientation measurement units 113 and 117.

When the reference image model is used as the measurement model information, a reference image of the highest degree of match based on the template matching using the reference image model as a template is obtained, and based on the position and orientation information about the target object associated with the reference image, the position and the orientation of the target object 103 is obtained. When the three-dimensional geometric model is used as the measurement model information, the position and the orientation of the target object 103 are obtained by associating a line which is a side of a three-dimensional geometric model and an edge component extracted from the two-dimensional image which is output from the second sensor information acquisition unit 112, similar to the three-dimensional position and orientation measurement unit 113.

The position and orientation output unit 119 outputs the coordinate value of the second position and orientation where the second sensor unit 102 measures the target object 103 to the robot controller unit 120.

The robot controller unit 120 receives the coordinate value of the second position and orientation where the second sensor unit 102 measures the target object 103, and moves the robot 100 to a predetermined position. A method for instructing the robot 100 to move to a position and an orientation different from the second position and orientation or to grab or suck the target object 103 upon moving the hand to a position and an orientation where the robot 100 can grab or suck the target object 103 may be controlled by a program of the robot controller unit 120 or may be controlled another sequencer. The work performed by the robot is not limited to moving, grabbing, and sucking, and it is to be understood that the work performed by the robot also includes other works such as external inspection of the target object 103. Further, it is to be understood that the robot may not be an articulated robot, and may be a movable machine that can accept numerical control (NC).

Figure 4:
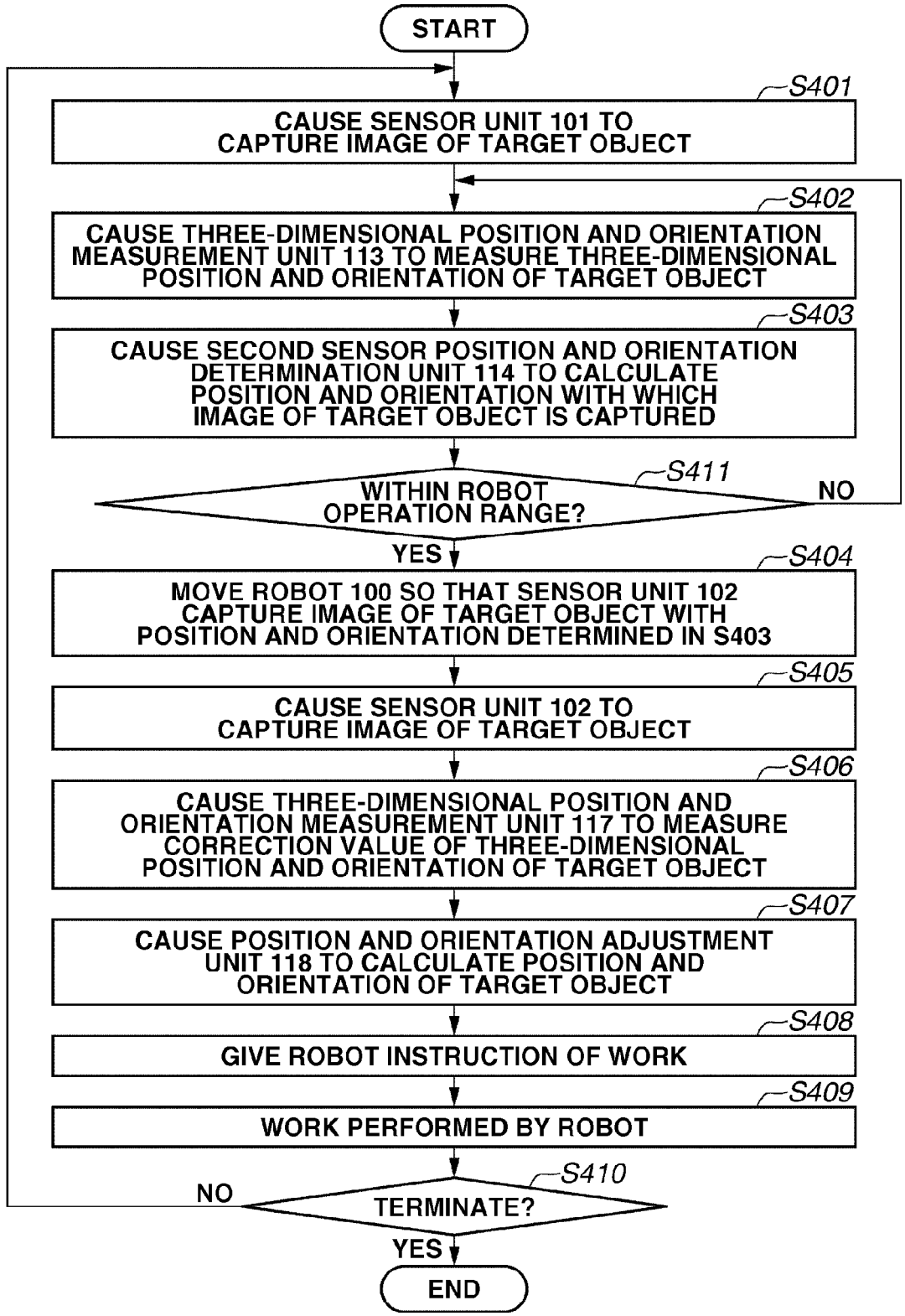
FIG. 4 is a flowchart illustrating a processing procedure of an information processing unit.

FIG. 4 is a flowchart illustrating processing procedures of the information processing unit 110 according to the first exemplary embodiment.

In step S401, an image of the target object 103 is captured by the first sensor unit 101 fixed at the first position and orientation above the pallet 104. The captured image data is output to the first sensor information acquisition unit 111. The position and the orientation of the first sensor unit 101 are obtained in advance by calibration.

In step S402, the three-dimensional position and orientation measurement unit 113 obtains a position and an orientation of at least one of the plurality of target objects 103 using the image of the target object 103 obtained by the first sensor information acquisition unit 111. The selected target object will be hereinbelow referred to as a target object 103'. To obtain the position and the orientation of the target object 103', the model information storage unit 115 outputs the measurement model information stored therein, and the three-dimensional position and orientation measurement unit 113 compares the image of the target object 103' with the measurement model information to determine matching therewith.

When the three-dimensional geometric model is used as the measurement model information, the position and the orientation of the target object are obtained by associating a line segment which is a side of the three-dimensional geometric model and an edge component extracted from the two-dimensional image which is output from the first sensor information acquisition unit 111. According to the present exemplary embodiment, the Gauss-Newton method which is one of non-linear optimization methods is used to repeatedly correct the approximate values of the position and the orientation of the target object (represented by a six dimensional vector s) by the iterative operation so that the three-dimensional geometric model matches the two-dimensional image. The optimization method for obtaining the position and the orientation of the target object is not limited to the Gauss-Newton method.

Figure 5A:
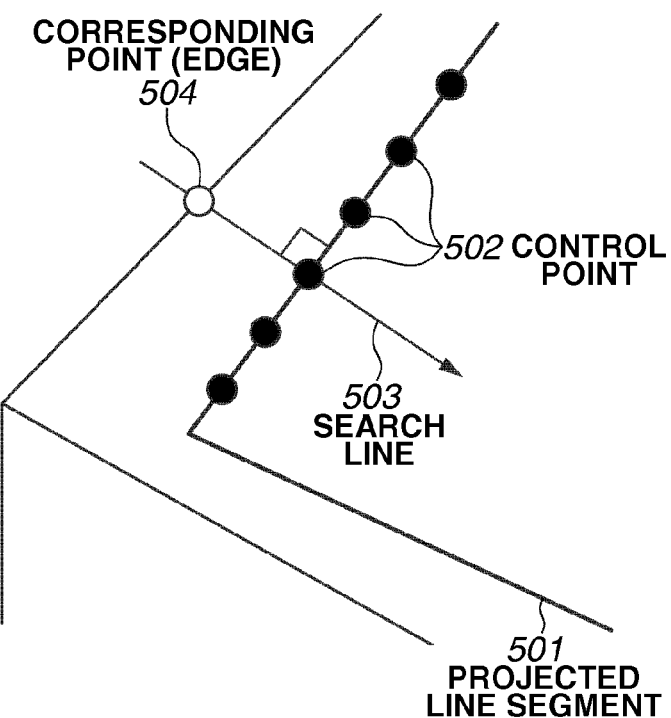
FIGS. 5A and 5B illustrate edge detection.
Figure 5B:
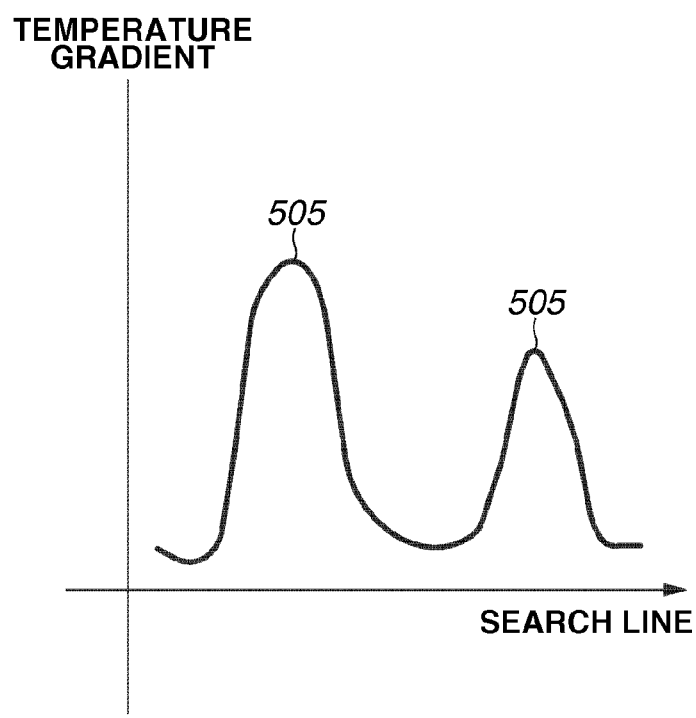

FIG. 5 illustrates how an edge is detected. A projected image onto an image of each line segment constituting the three-dimensional geometric model is calculated using approximate position and orientation of the target object obtained by a certain method (for example, template matching) and internal parameters of the sensor unit 101 which have been already calibrated. A projected image of a line segment also becomes a line segment on the image. Subsequently, control points 502 are set on a line segment 501 projected with the same distance on the image, and for each control point 502, one-dimensional edge 504 is detected in a normal line direction 503 of the projected line segment 501 (FIG. 5A). The edge is detected as an extreme value of a density gradient of a pixel value, and therefore, as illustrated in FIG. 5B, a plurality of edges 505 may be detected. According to the present exemplary embodiment, all the detected edges are stored as hypotheses.

To obtain the position and the orientation of the target object by associating a line segment which is a side of the three-dimensional geometric model and an edge component of the two-dimensional image which is output from the first sensor information acquisition unit 111, a coefficient matrix for calculating the position and the orientation and an error vector are calculated. In this case, each element of the coefficient matrix is primary partial differential coefficient concerning each element of the position and the orientation when a distance between a straight line and a point on an image is made as a function of position and orientation. With regard to an edge, the error vector is a signed distance between a projected line segment and a detected edge on the image.

Figure 6:
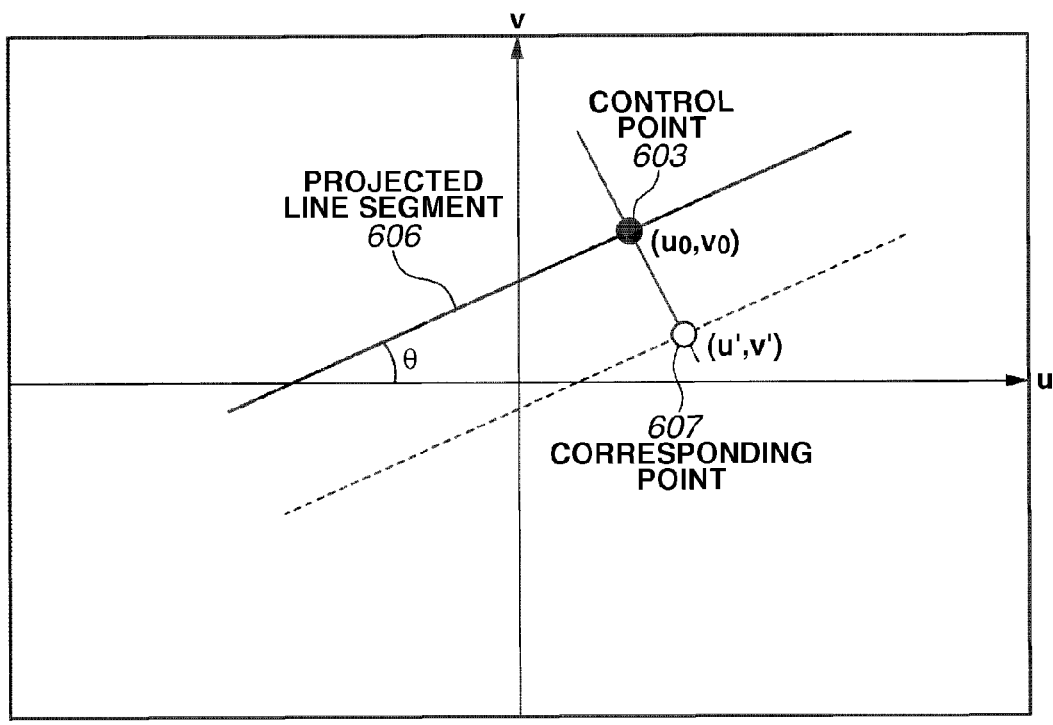
FIG. 6 illustrates a relationship between a projected image of a line segment and a detected edge.

How the coefficient matrix is derived will be hereinbelow described. FIG. 6 illustrates a relationship between a projected image of a line segment and a detected edge. In FIG. 6, the horizontal direction and the vertical direction of the image are denoted as a u axis and a v axis, respectively. A coordinate of a certain control point 603 (a point obtained by dividing each projected line segment with equal distance on the image) on the image is denoted as (u0, v0), and an inclination of the line segment to which the control point 603 belongs on the image is denoted as an inclination θ with respect to the u axis. The inclination θ is calculated such that three dimensional coordinates of both ends of the line segment 606 are projected onto the image based on s, and the inclination θ is calculated as an inclination of a straight line connecting the coordinates of the both ends on the image. A normal line vector of the line segment 606 on the image is denoted as (sin θ, −cos θ). A coordinate of the corresponding point 607 of the control point 603 on the image is denoted as (u', v'). In this case, a point (u, v) on a straight line (a broken line in FIG. 6) which passes the coordinate (u', v') of the corresponding point 607 and of which inclination is θ is represented by an expression (1) (θ is a constant). In this case, "d" is a constant represented by an expression (2).

[Equation 1]

$$u \sin \theta - v \cos \theta = d \qquad (1)$$

$$d = u' \sin \theta - v' \cos \theta \qquad (2)$$

The position of the control point 603 on the image is changed by the position and the orientation of the target object. The degree-of-freedom of the position and the orientation of the target object is six degrees of freedom. More specifically, s is a six dimensional vector including three elements representing the position of the target object and three elements representing the orientation thereof. The three elements representing the orientation are expressed by, for example, Euler angles and three dimensional vectors in which a direction represents a rotation axis passing the origin and a norm represents a rotation angle. The coordinate (u, v) of the point on the image that changes according to the position and the orientation can be approximated as shown in an expression (3) and an expression (4) by first-order Taylor expansion in proximity to the coordinate (u0, v0). Wherein, $\Delta s_i$ (i=1, 2, . . . , 6) denotes a minimal change of each component of s.

[Equation 2]

$$u \cong u_0 + \sum_{i=1}^{6} \frac{\partial u}{\partial s_i} \Delta s_i \quad (3)$$

$$v \cong v_0 + \sum_{i=1}^{6} \frac{\partial v}{\partial s_i} \Delta s_i \quad (4)$$

If it is assumed that there is not much difference between the approximate value of the position and the orientation and actual position and orientation of the target object, the position of the control point on the image obtained from a correct s can be considered to be on a straight line represented by the expression (1) and the expression (2). An expression (5) can be obtained by subsiting values u and v approximated by the expression (3) and the expression (4) into the expression (1) and the expression (2). In this case, a constant r is represented by an expression (6).

[Equation 3]

$$\sin\theta \sum_{i=1}^{6} \frac{\partial u}{\partial s_i} \Delta s_i - \cos\theta \sum_{i=1}^{6} \frac{\partial v}{\partial s_i} \Delta s_i = d - r \quad (5)$$

$$r = u_0 \sin\theta - v_0 \cos\theta \quad (6)$$

The expression (5) and the expression (6) can be formulated for all the edges associated. Instead of formulating the expression (5) and the expression (6) for all the edges, it may be possible to formulate the expression (5) and the expression (6) for only some of the edges.

The expression (5) and the expression (6) are expressions concerning the minimal change $\Delta s_i$ (i=1, 2, . . . , 6) of each component of s, and therefore, linear simultaneous equations concerning $\Delta s_i$ can be set up as shown in an expression (7).

[Equation 4]

$$\begin{bmatrix} \sin\theta_1 \frac{\partial u}{\partial s_1} - \cos\theta_1 \frac{\partial v}{\partial s_1} & \sin\theta_1 \frac{\partial u}{\partial s_2} - \cos\theta_1 \frac{\partial v}{\partial s_2} & \cdots & \sin\theta_1 \frac{\partial u}{\partial s_6} - \cos\theta_1 \frac{\partial v}{\partial s_6} \\ \sin\theta_2 \frac{\partial u}{\partial s_1} - \cos\theta_2 \frac{\partial v}{\partial s_1} & \sin\theta_2 \frac{\partial u}{\partial s_2} - \cos\theta_2 \frac{\partial v}{\partial s_2} & \cdots & \sin\theta_2 \frac{\partial u}{\partial s_6} - \cos\theta_2 \frac{\partial v}{\partial s_6} \\ \vdots & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \end{bmatrix} \quad (7)$$

In this case, the expression (7) is represented as shown in an expression (8).

$$J\Delta s = E \quad (8)$$

To calculate the coefficient matrix J of the linear simultaneous equations, partial differential coefficients are calculated. Based on the expression (8), the correction value $\Delta s$ of the position and the orientation is derived with the least squares criterion using a generalized inverse matrix $(J^T \cdot J)^{-1} \cdot J^T$ of the matrix J. However, since the edges include many outliers due to false detection and the like, a robust estimation method described below will be used. In general, with an edge which is an outlier, a value of an error vector at the right hand side of the expression (7) increases. Accordingly, a smaller weight is given to information in which the absolute value of the error is large, and a larger weight is given to information in which the error is small. The weight is given by, for example, a Tukey function as indicated in an expression (9).

[Equation 5]

$$w(z(d-r)) = \begin{cases} (1 - (z(d-r)/c_1)^2)^2 & |z(d-r)| \le c_1 \\ 0 & |z(d-r)| > c_1 \end{cases} \quad (9)$$

$$w(e-q) = \begin{cases} (1 - ((e-q)/c_2)^2)^2 & |e-q| \le c_2 \\ 0 & |e-q| > c_2 \end{cases}$$

In the expression (9), $c_1$, $c_2$ are constants. The function giving weights may not be a Tukey function. The function is not particularly limited as long as it is a function that gives a smaller weight to information in which the error is large and gives a larger weight to information in which the error is small, for example, a Huber function. A weight corresponding to each piece of measurement information (edge or point group data) is denoted as $w_i$. In this case, a weight matrix W is defined as shown in an expression (10).

[Equation 6]

$$W = \begin{bmatrix} w_1 & & & 0 \\ & w_2 & & \\ & & \ddots & \\ 0 & & & \end{bmatrix} \quad (10)$$

The weight matrix W is a square matrix of which elements are all zero except those in the diagonal line, and the weight $w_i$ enters in the diagonal components. Using the weight matrix W, the expression (8) is converted into an expression (11).

$$WJ\Delta s = WE \quad (11)$$

The correction value $\Delta s$ is derived by solving the expression (11) as shown in an expression (12).

[Equation 7]

$$\Delta s = (J^T W J)^{-1} J^T W E \quad (12)$$

The approximate values of the position and the orientation are corrected with the correction value Δs of the position and the orientation calculated.

$$s \leftarrow s + \Delta s$$

Then, convergence of s is determined. If s is converged, the calculation is terminated, whereas if s is not converged, the calculated is repeated. In the convergence determination, the convergence is determined when the correction value Δs is substantially zero or a square sum of error vectors does not change before and after the correction. As described above, the position and the orientation can be calculated by repeating the calculation until convergence.

According to the present exemplary embodiment, a method using the Gauss-Newton method as the optimization method is described. However, calculation may be executed according to the Levenberg-Marquardt method in which calculation is more robust, or may be executed according to the steepest descent method which is a simpler method. In addition, other non-linear optimization calculation methods such as a conjugate gradient method and the Incomplete Cholesky Conjugate Gradient (ICCG) method may be used.

When the reference image model is used as the measurement model information, a reference image of the highest degree of match based on template matching using the reference image model as a template is obtained, and the position and the orientation of the target object are obtained based on the position and orientation information about the target object associated with the reference image. When the luminance of the reference image is denoted as T (i, j), the luminance of the two-dimensional image is denoted as I (i, j), and the reference image is an image of m×n pixels, then a degree of coincidence can be obtained from an expression (13).

[Equation 8]

$$R = \sum_{j=0}^{n-1} \sum_{i=0}^{m-1} (I(i,j) - T(i,j))^2 \qquad (13)$$

When the three-dimensional geometric model is used as the measurement model information, the position and the orientation of the target object are obtained by associating a point group on the surface extracted from the three-dimensional geometric model and a distance image point group which is output from the first sensor information acquisition unit 111. To obtain the distance point group, conventional techniques, such as a spatial coding method and a light-section method may be used, and therefore, it will not be described in detail in the present exemplary embodiment. To associate the point group of the three-dimensional geometric model and the distance image point group, the Iterative Closest Point (ICP) method is used in the present exemplary embodiment.

A surface point group of the three-dimensional geometric model will be represented as P as shown in an expression (14). The distance image point group will be represented as A as shown in an expression (15).

[Equation 9]

$$P = \{p_1, p_2, \ldots, p_{N_p}\} \qquad (14)$$

$$A = \{a_1, a_2, \ldots, a_{N_a}\} \qquad (15)$$

The surface point group P of the three-dimensional geometric model is converted and is aligned with the distance point group A. When a point in the point group A which is the closest to each point $p_i$ of the point group P is denoted as $b_i \in A$, an error function of an expression (16) can be defined. R and t are an orientation parameter and a movement vector, respectively.

[Equation 10]

$$E(R, t) = \sum_{i=1}^{N_p} \|b_i - (Rp_i + t)\|^2 \qquad (16)$$

R and t for reducing the error function E are calculated, and correction is made according to an expression (17).

[Equation 11]

$$P \leftarrow RP + t \qquad (17)$$

A method for obtaining R and t for reducing the error function E is described in a document, K. S. Arun, T. S. Huang, and S. D. Blostein, "Least-Squares Fitting of Two 3-D Point Sets," PAMI, vol. 9, no. 5, 1987.

The convergence of P is determined, and if P is converged, the calculation is terminated. Whereas if P is not converged, correction calculation is performed repeatedly. In the convergence determination, when P hardly changes, the convergence is determined. By repeating the calculation until P is converged, the position and the orientation can be calculated.

In step S403, the position and the orientation of the second sensor unit 102 is calculated from the first measurement result. In other words, the second sensor position and orientation determination unit 114 calculates the position and the orientation at which the second sensor unit 102 captures an image.

In general, in a case of a multi-axial robot, it is difficult to achieve the absolute position accuracy. In addition, when the target object is inclined, and the direction in which the end effector grabs the target object and the direction in which the target object is observed by the first sensor unit 101 are different, deviation may occur depending on the accuracy of estimation. Accordingly, immediately before the robot 100 grabs the target object 103', the robot 100 can reliably grab the target object by calculating the position and the orientation of the target object by the second sensor unit 102 to correct the error and issuing an instruction of the correction position to the robot 100. Accordingly, the robot 100 causes the second sensor unit 102 to measure the position and the orientation of the target object 103' at a position higher than the position where the robot grabs the target object 103'.

Figure 7A:
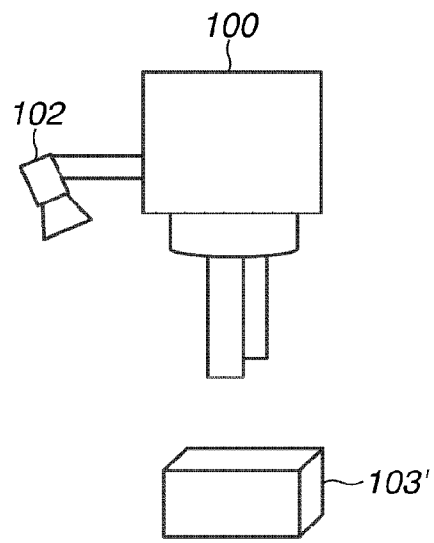
FIGS. 7A to 7C illustrate relationships among a robot, a second sensor unit, and a target object.

FIG. 7A illustrates arrangement when the second sensor unit 102 captures an image of the target object 103' thereabove immediately before the robot 100 grabs the target object 103'. The robot 100 is set to grab the target object 103' from a predetermined direction. The second sensor unit 102 obtains the two-dimensional image and accordingly, the sensor unit 102 can obtain the position and the orientation of an object from edges in the image.

Figure 7B:
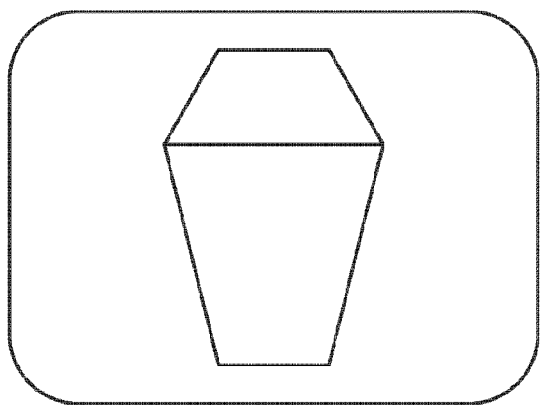

FIG. 7B is an example of a two-dimensional image captured by the second sensor unit 102. The direction in which the end effector of the robot grabs the target object and the direction of the camera are different from each other, and therefore, the target object 103' in the captured image may appear to be perspective. In the template matching of the two-dimensional image, when the target object 103' appears to be perspective, the matching can be performed by obtaining homography of a plane and making correction and converting the image into an orthogonal projection.

In this case, coordinate system expression for calculating the position and the orientation at which the second sensor unit 102 captures an image will be described.

Figure 7C:
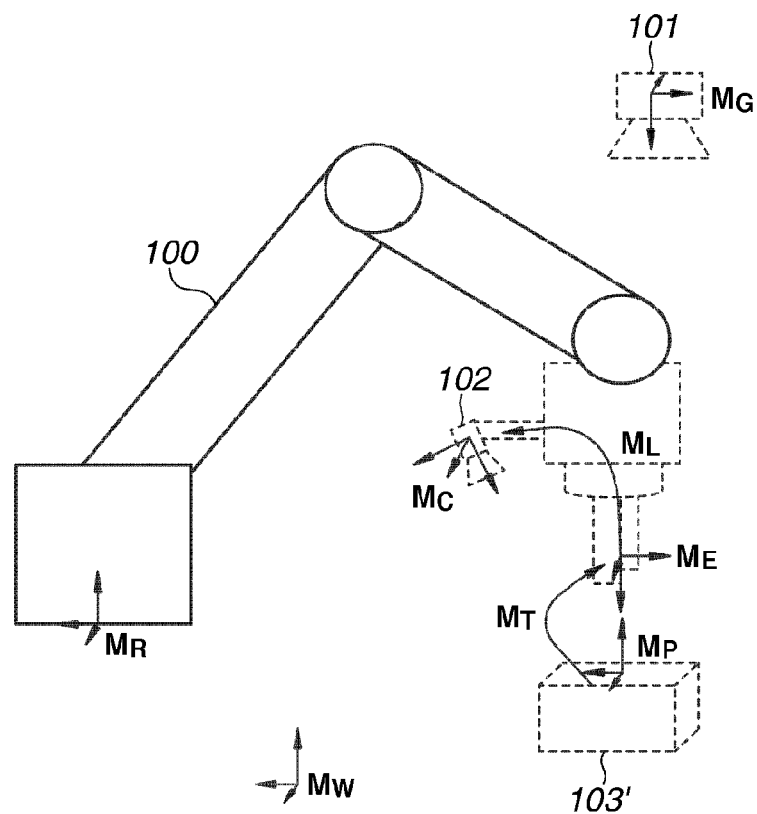

FIG. 7C schematically illustrates the origin of each coordinate system. The world coordinate system serving as the reference is defined as M. The coordinate system where the first sensor unit 101 is attached is defined as $M_G$. The robot coordinate system is defined as $M_R$, and the coordinate system of the end effector is defined as $M_E$ which is a relative coordinate system with respect to the robot coordinate system. The coordinate system $M_C$ of the second sensor unit 102 is a relative coordinate system with respect to the coordinate system $M_E$ of the end effector by a transformation matrix $M_L$. The coordinate system of the plane having the geometric feature of the upper portion of the target object 103' is defined as $M_P$. When a position and orientation obtained by the three-dimensional position and orientation measurement unit 113 based on the camera coordinate system reference of the coordinate system $M_G$ of the first sensor unit 101 is defined as $M_P'$, the position and the orientation $M_P'$ are as shown in an expression (18).

$$M_P = M_G M_P' \qquad (18)$$

An observation point above the target object 103' is considered to be set in advance in view of a grabbing orientation, and accordingly, relative coordinate transformation with respect to the target object is defined as $M_T$. When a coordinate system set as a standby position of the end effector is defined as $M_E'$ from the coordinate system $M_P$ of the plane of the target object 103' thus obtained, the coordinate system $M_E'$ is as shown in an expression (19).

$$M_E' = M_P M_T \qquad (19)$$

The position and the orientation at which the second sensor unit 102 captures an image may be designated so that the coordinate system $M_E$ of the end effector becomes the same as the coordinate system $M_E'$. The inverse transformation of the coordinate system is expressed as $M^{-1}$, the coordinate system $M_E$ can be expressed as shown in an expression (20) using the robot coordinate system $M_R$.

$$M_E = M_R^{-1} M_E' \qquad (20)$$

Thus obtained coordinate system $M_E$ becomes the values of the position and the orientation in the robot coordinate system serving as the second position and orientation.

When the coordinate system $M_C'$ at the position and the orientation where the second sensor unit 102 captures an image of the target object 103' is expressed with a relative coordinate system with respect to the target object 103, it can be expresses as shown in an expression (21).

$$M_C' = M_T M_L \qquad (21)$$

By using the relative coordinate system $M_C'$ with respect to the target object, an arrangement relationship of the target object with the plane having the geometric feature during image capturing can be set, and the nomography matrix for correcting how the plane appears in the perspective can be obtained.

Among the components of the relative coordinate system $M_C'$, the orientation component is defined as $R_C$ and represented as 3×3 matrix and the translational component is defined as $T_C$ and represented as 3×1 matrix. A normal line of the coordinate system MP of the plane of the target object 103' is defined as $N_C$, and a distance between the plane and the second sensor unit 102 is defined as $D_C$, a homography matrix H is as shown in an expression (22).

[Equation 12]

$$H = \left( R_c + \frac{T_c N_c^T}{D_c} \right) \qquad (22)$$

With the use of the homography matrix H, if the captured image of the target object 103' appears to be perspective, it can be converted into the orthogonal projection, and the position and the orientation can be estimated from the features in the two-dimensional image (however, the geometric feature of the target object 103' is considered to be arranged in a plane). Accordingly, regardless of the attachment position of the second sensor unit 102, the geometric feature on the plane of the target object 103' can be corrected according to the captured image, and therefore, the model information storage unit 116 can easily register the geometric feature information. More specifically, the image position of the geometric feature when the model is projected orthogonally may be used.

In step S411, it is determined that whether the second position and orientation obtained in step S403 is within a movable range of the robot 100. The movable range of the robot 100 is limited due to the configuration of the movable arm. Therefore, if the position and the orientation are set in a direction in which the end effector of the robot is unreachable, the robot 100 cannot be activated in reality. In this case, when the second position and orientation are not within the movable range of the end effector (NO in step S411), the processing returns to step S402, and the position and the orientation of a component not selected are detected again. Accordingly, the system can be prevented from stopping due to inability of the robot 100 to pick up a component.

When the three-dimensional position and orientation measurement unit 113 obtains the position and the orientation of the target object 103', the three-dimensional position and orientation measurement unit 113 outputs the position and orientation information about the target object 103' to the second sensor position and orientation determination unit 114 and the position and orientation adjustment unit 118.

In step S404, the orientation of the robot 100 is controlled so that the second sensor unit 102 captures an image of the target object 103' with the second position and orientation which is determined to be within the operable range of the movable unit of the robot 100 in step S411 (YES in step S411). In step S404, first, the position and orientation information determined in step S403 is converted into the robot coordinate system. The expression (19) may be used as the conversion method. A command for designating the position and the orientation and moving the robot 100 is transmitted to the robot controller unit 120.

In step S405, the second sensor unit 102 attached to the robot 100 captures an image of the target object 103' with the second position and orientation. The captured image is output to the second sensor information acquisition unit 112.

In step S406, the three-dimensional position and orientation measurement unit 117 obtains the position and the orientation of the target object 103' from the two-dimensional image obtained from the second sensor information acquisition unit 112 using values of the position and the orientation stored in the model information storage unit 116 and the second sensor position and orientation determination unit 114.

In this processing, based on the homography matrix H obtained in step S403, the position of the geometric feature stored in the model information storage unit 116 is projected and transformed, and a corresponding image geometric feature in proximity thereto is detected. Then, the coordinate value thereof is subjected to inverse transformation of the homography to eliminate the effect of the perspective. Movement and rotation components in the plane are obtained as a correction value to reduce the difference between the position of the detected feature and the position of the geometric feature of the model. Based on the correction value, the value of the position and the orientation obtained from the second sensor position and orientation determination unit 114 can be corrected.

The correction value for the two-dimensional feature on the plane is defined as (u, v, θ), in which u denotes an X coordinate, v denotes a Y coordinate, and θ denotes rotation within the plane. When the coordinates of the two-dimensional feature are defined as X and Y, corrected positions X' and Y' are shown by an expression (23).

[Equation 13]

$$\begin{bmatrix} X' \\ Y' \end{bmatrix} = \begin{bmatrix} \cos(\theta) & \sin(\theta) & u \\ -\sin(\theta) & \cos(\theta) & v \end{bmatrix} \begin{bmatrix} X \\ Y \\ 1 \end{bmatrix} \quad (23)$$

When a correction amount is sufficiently small, cos(θ) and sin(θ) can be approximated as follows: cos(θ)≈1, sin(θ)≈θ, and therefore, the expression (23) can be approximated as an expression (24).

[Equation 14]

$$\begin{bmatrix} X' \\ Y' \end{bmatrix} \cong \begin{bmatrix} 1 & \theta & u \\ -\theta & 1 & v \end{bmatrix} \begin{bmatrix} X \\ Y \\ 1 \end{bmatrix} \quad (24)$$

This expression is expanded into a matrix expression with the vector of the correction amount, the matrix can be expressed as an expression (25).

[Equation 15]

$$\begin{bmatrix} 1 & 0 & Y \\ 0 & 1 & -X \end{bmatrix} \begin{bmatrix} u \\ v \\ \theta \end{bmatrix} = \begin{bmatrix} X' - X \\ Y' - Y \end{bmatrix} \quad (25)$$

This expression is expressed as shown in an expression (26) with respect to the position of the model and the coordinate value corrected with the homography matrix of each point of the detected geometric feature, and the correction amount is obtained using the pseudo-inverse matrix. However, since the expression (24) is subjected to linear approximation, the calculation is repeatedly performed, so that the correction amount is obtained to reduce the residual.

[Equation 16]

$$\begin{bmatrix} 1 & 0 & Y_1 \\ 0 & 1 & -X_1 \\ & \vdots & \\ 1 & 0 & Y_n \\ 0 & 1 & -X_n \end{bmatrix} \begin{bmatrix} u \\ v \\ \theta \end{bmatrix} = \begin{bmatrix} X'_1 - X_1 \\ Y'_1 - Y_1 \\ \vdots \\ X'_n - X_n \\ Y'_n - Y_n \end{bmatrix} \quad (26)$$

In this case, the calculation of the correction amount using detection coordinate of the geometric feature is described. However, any method can be used as long as the position and rotation of the target object can be detected within the plane. It may be possible to use, e.g., a method for detecting a position of the target object from a Hough transform image and a detection method using spatial image transform such as fast Fourier transform (FFT).

In step S407, in the processing of the position and orientation adjustment unit 118, the position and the orientation of the target object 103' is adjusted using the correction value of the position and the orientation obtained in step S406 with respect to an estimated value of the position and the orientation of the first sensor unit 101 obtained in step S403.

Since an image to be obtained by the second sensor unit 102 is a two-dimensional image, information in the depth direction is degenerated. Therefore, the accuracy of estimation in the depth direction may be lower as compared with that in the movement direction within the image plane. Accordingly, correction is performed by giving a weight to the correction amount which appears to have a high degree of accuracy from among the correction values in step S406.

In the coordinate system $M_C$ of the second sensor unit 102, the rotation in the visual axis direction and the component in X and Y directions within a plane perpendicular to the visual axis are extracted, a weight larger than other parameters is given to the value thereof, and the value of the position and the orientation obtained in step S403 is corrected. More specifically, the values of X, Y, and Roll components are updated with updating parameters obtained based on the camera coordinate system of the second sensor unit 102. Therefore, as compared with a result estimating the position and the orientation with only the two-dimensional image, the position and the orientation can be adjusted based on highly accurate elements of the parameters of the position and the orientation by the first sensor unit 101 and a highly accurate portion of the parameters of the position and the orientation by the second sensor unit 102. Accordingly, the accuracy of estimation can be entirely improved. In this case, an example of updating the values of the X, Y, and Roll components is described, but the parameters may be adjusted according to the orientation of the target object and the configuration of the first sensor unit 101. A covariance matrix and an error value calculated during estimation of the position and the orientation are referred to as the accuracy of estimation of each parameter, and the estimated values of the first sensor unit 101 and the second sensor unit 102 can be adjusted by adopting them as the weight.

In step S408, the work instruction is issued to the robot 100 based on the position and orientation information about the target object 103' of the position and orientation adjustment unit 118. If the robot 100 includes a hand for grabbing the target object 103', the robot is given an instruction to grab the target object 103'. If the robot 100 includes a pad for sucking the target object 103', the robot 100 is given an instruction to suck the target object 103'.

In step S409, to execute the contents of the instruction in step S408, the robot 100 is caused to execute a predetermined operation sequence such as picking, then moving and attaching the grabbed component.

In step S410, it is determined that whether a termination instruction is given. When the termination instruction is not given (NO in step S410), the processing returns to step S401. When the termination instruction is given (YES in step S410), the processing illustrated in the flowchart is terminated, and all the operation is stopped. A user can terminate the processing in the flowchart and stop all the operation without waiting for the termination determination in step S410 by pressing an emergency stop button (not illustrated).

According to the present exemplary embodiment, the processing from step S405 to step S406 is describing as a part of the configuration of the information processing unit 110. However, in reality, an apparatus different from the information processing unit 110 may be used instead. A processing unit for capturing a two-dimensional image, performing template matching of the image set in advance, and outputting a movement amount (u, v, θ) within a plane may be provided in the same housing in which the second sensor unit 102 is installed. Such a sensor may be the one commercially available as an image processing camera. According to the present exemplary embodiment, the robot is given an instruction to direct the sensor to the direction of the two-dimensional image template, and therefore, the orientation of the target component observed by the second sensor unit 102 can be made the same. Therefore, a conventional two-dimensional image processing apparatus can be used for stacked components of which orientations are irregular, and thus the apparatus cost can also be reduced.

In a second exemplary embodiment, an estimated value of a position and an orientation of a target object based on the first sensor unit can be converted into an observation direction based on the second sensor unit. Therefore, if the second sensor unit stores therein sufficient measurement model information supporting various orientations, the estimated value of the position and the orientation of the first sensor unit can be used as an initial value for estimating the position and the orientation in association with the setting information in the second sensor unit.

In the processing of the three-dimensional position and orientation measurement unit 117 with the second sensor unit 102, the position and orientation estimation can be performed with the three-dimensional geometric model of the first sensor unit 101. In this case, the model information storage units 115 and 116 can be shared. The shred unit will be referred to as a model information storage unit 115'.

The second sensor position and orientation determination unit 114 may determine the position and the orientation of the second sensor unit 102 according to an orientation of a model observed from an apex of the geodesic sphere storing the three-dimensional geometric model included in the model information storage unit 115'. At this occasion, when an observation point at which an amount of movement of the robot is small is selected in view of an orientation of the robot at that point and an orientation in a post-process, the tact time may be shorter.

The three-dimensional position and orientation measurement unit 117 obtains the position and the orientation of the second sensor position and orientation determination unit 114 from a captured image captured by moving the second sensor unit 102. At this occasion, the position and the orientation which are obtained by converting the position and the orientation of the robot hand calculated by the second sensor position and orientation determination unit 114 into the coordinate system of the second sensor unit 102 are adopted as an initial value of the position and the orientation of the target object 103'. Scale conversion with the three-dimensional geometric model observed from an apex of the geodesic sphere and the camera parameters of the second sensor unit 102 is performed from the initial position and orientation, and accordingly, detection of the geometric features corresponding to the model will be easier.

In the first exemplary embodiment, as the processing of the position and orientation adjustment unit 118, the parameter adjustment unit in the X, Y, and Roll directions in which the accuracy of estimation is high as the visual axis direction of the camera of the second sensor unit 102 is described. In reality, still higher accuracy can be obtained when considering the direction in which the target object is grabbed by the end effector, the orientation of the target component, and the accuracy of estimation of the parameters for the position and the orientation of the first sensor unit 101. In the estimation of the position and the orientation, a matrix obtained by partially differentiating the observation equation of the model for each parameter with three degrees of freedom of the position and three degrees of freedom of the orientation is adopted as Jacobian matrix, and the calculation is repeated to reduce the distance between the model and the corresponding geometric feature. The estimated values of the position and the orientation can be used as the value representing the degree of fitting of the parameters from the residual of the model and each geometric feature by the estimated parameters. By using information representing the residual by observation, the accuracy can be improved with the parameter adjustment unit of the position and orientation estimation results estimated by each of the first and the second. When much noise is included and the residual is large, the likelihood of the obtained parameter is low, and accordingly, adjustment may be performed to reduce the weight. Whereas, if the residual is small, adjustment may be performed to increase the weight.

The target object is considered to be in various forms, and therefore, the appearance may greatly change depending on the observation direction such as a thin and long shape and a flat and thin shape. In the first exemplary embodiment, the example of determining the second position and orientation when the hand is temporarily stopped above the grabbing position is described. At this occasion, the association is obtained based on the conversion with the nomography matrix using the geometric feature on the plane of the target object. Alternatively, the position and the orientation of the second sensor may be determined at the position and the orientation that do not require conversion. In addition, when the template matching is used as the method for determining the position, a direction in which characteristic geometric features can be observed may be determined to be the second position and orientation. For example, the second position and orientation may be determined to a direction capable of observing a mechanically-readable marker such as characters, a seal, and a quick response (QR) code (registered trademark) attached to a component.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments, the robot is described as the movable unit including the movable portion capable of changing the position and the orientation. However, any configuration may be employed as long as the second sensor is basically attached to the movable mechanism. The second sensor may be the one including pan/tilt mechanism on a rotation pedestal and an X, Y stage. Depending on the shape of the target component and how it is supplied, the range of the position and the orientation of the target component may be determined. In such case, a range for the position and the orientation of the second sensor is also determined, and a movable apparatus appropriate for the range may be used.

The first sensor unit may be arranged separately from the movable unit, and the first sensor unit may be any unit as long as observation information required to estimate the position and the orientation can be obtained with the configuration of the first sensor unit and the first measurement unit. According to the exemplary embodiments, the configuration for obtaining three-dimensional information to estimate the information about the position and the orientation of the target object is described. The units for obtaining the three-dimensional information as described above may include apparatuses for obtaining depth information such as a projector and a camera included in a stereo camera, a plurality of cameras, scanning and laser light patterns of laser slit light and a camera, and random dot emission and a camera, and Time of Flight. In addition, when the second sensor unit is arranged at a predetermined position, and a camera is used as the first sensor unit is, they can be configured as the first and second stereo cameras. In such case, a baseline of the first and second cameras may be calibrated in advance.

The second sensor unit may be in any configuration as long as the movable unit can be attached. The observation information obtained by the second sensor unit is adjusted according to movement of the movable portion based on the first measurement result. In general, the position and orientation detection by the image processing using the captured image of the two-dimensional camera can be used. Only the position in the plane may be detected when the target component is observed from the second sensor unit, and therefore, reflection from the target component may be detected with a proximity sensor and the like at a predetermined point. Further, instead of a two-dimensional image, a line sensor may be used to detect a position.

The method for calculating the position and the orientation of the target component with the first measurement unit and the second measurement unit may be any method as long as it is a method for obtaining the position and the orientation other than the present exemplary embodiment. When a color image is used, a detection result of the gravity of a color region and a direction using information about the color of the target component can be used to calculate the position and the orientation of the target component. When a target component has a pattern in a local region of its surface, the geometric feature of the pattern may be used to perform association. If there are three points or more of which association are already known, the position and the orientation of the target object can be obtained. Therefore, when the position of the geometric feature of the image associated with the measurement model is used, the position and the orientation of the target object can be estimated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-193369 filed Sep. 3, 2012, which is hereby incorporated by reference herein in its entirety.

What is claimed is:

1. An information processing apparatus comprising:
   at least one processor; and
   a memory for storing instructions to be executed by the at least one processor,
   wherein when the instructions stored in the memory are executed by the at least one processor, the information processing apparatus functions as:
      a first obtaining unit configured to obtain first measurement information about a target object sensed by a first sensor with a first position and orientation, wherein the first measurement information is two-dimensional information or three-dimensional information about a target object;
      a first measurement unit configured to measure a first three-dimensional position and orientation of the target object based on the first measurement information about the target object;
      a sensor position and orientation determination unit configured to determine, based on the first three-dimensional position and orientation of the target object, a second position and orientation of a second sensor which is attached on a movable unit and senses only two-dimensional information, wherein the second sensor is different from the first sensor;
      a movable range determination unit configured to determine whether the second position and orientation is within a movable range of the movable unit;
      a control unit configured to control the movable unit so that the position and orientation of the second sensor is the second position and orientation in a case where the movable range determination unit determines that the second position and orientation is within a movable range of the movable unit;
      a second obtaining unit configured to obtain second measurement information about the target object sensed by the second sensor with the second position and orientation, wherein the second measurement information is two-dimensional information about the target object; and
      a second measurement unit configured to measure three-dimensional position and orientation of the target object based on the second measurement information sensed by the second sensor with the second position and orientation.

2. The information processing apparatus according to claim 1, wherein the sensor position and orientation determination unit determines a positional relationship from the first position and the orientation of the target object by the first measurement unit so as to maintain relative position and orientation between the target object and the second sensor as an observation position of model information registered in advance.

3. The information processing apparatus according to claim 1, wherein the measurement result by the first measurement unit and the second position and orientation calculated by the sensor position and orientation determination unit are used as an initial value with which the second measurement unit measures the three-dimensional position and orientation of the target object.

4. The information processing apparatus according to claim 1, wherein when the instructions stored in the memory are executed by the processor, the information processing apparatus further functions as:
an adjustment unit configured to calculate three-dimensional position and orientation of the target object based on the first three-dimensional position and orientation of the target object and the three-dimensional position and orientation of the target object measured by the second measurement unit.

5. The information processing apparatus according to claim 1, in a case where the sensor position and orientation determination unit determines the second position and orientation, a determination is made as to whether the second position and orientation is within a movable range of the movable unit.

6. The apparatus according to claim 1, wherein the second measurement unit measures the three-dimensional position and orientation of the target object by correcting the first position and orientation of the target object using the second measurement information.

7. The information processing apparatus according to claim 6, wherein the second measurement unit determines, based on the second measurement information, only a parameter in a two-dimensional plane when the target object is observed with the second sensor among parameters indicating the three-dimensional position and orientation, and measures the three-dimensional position and orientation of the target object by using a parameter of the first three-dimensional position and orientation other than the parameter in the two-dimensional plane.

8. A method for information processing, the method comprising:
causing a first obtaining unit arranged with a first position and orientation to obtain first measurement information about a target object sensed by a first sensor, wherein the first measurement information is two-dimensional information or three-dimensional information about a target object;
measuring a first three-dimensional position and orientation of the target object based on the first measurement information about the target object;
determining, based on the first three-dimensional position and orientation of the target object, a second position and orientation of a second sensor which is attached on a movable unit, senses only two-dimensional information, wherein the second sensor is different from the first sensor;
determining whether the second position and orientation is within a movable range of the movable unit;
controlling the movable unit so that the position and orientation of the second sensor is the second position and orientation in a case where the movable range determination unit determines that the second position and orientation is within a movable range of the movable unit;
obtain second measurement information about the target object sensed by the second sensor with the second position and orientation, wherein the second measurement information is two-dimensional information about the target object; and
measuring the three-dimensional position and orientation of the target object based on the information obtained by the second sensor unit with the second position and orientation and the model information about the target object.

9. A computer-readable storage medium recording a program for causing a computer to execute, the program comprising:
processing for causing a first obtaining unit arranged with a first position and orientation to obtain first measurement information about a target object sensed by a first sensor, wherein the first measurement information is two-dimensional information or three-dimensional information about a target object;
first measurement processing for measuring a first three-dimensional position and orientation of the target object based on the first measurement information about the target object;
sensor position and orientation determination processing for determining, based on the first three-dimensional position and orientation of the target object, a second position and orientation of a second sensor which is attached on a movable unit, senses only two-dimensional information, wherein the second sensor is different from the first sensor;
movable range determination processing for determining whether the second position and orientation is within a movable range of the movable unit;
control processing for controlling the movable unit so that the position and orientation of the second sensor is the second position and orientation in a case where the movable range determination unit determines that the second position and orientation is within a movable range of the movable unit;
second obtaining processing for obtaining second measurement information about the target object sensed by the second sensor with the second position and orientation, wherein the second measurement information is two-dimensional information about the target object; and
second measurement processing for measuring the three-dimensional position and orientation of the target object based on the second measurement information sensed by the second sensor with the second position and orientation .

10. An information processing system comprising:
a first sensor;
a second sensor; and
an information processing apparatus comprising:
at least one processor; and
a memory for storing instructions to be executed by the at least one processor, wherein when the instructions stored in the memory are executed by the at least one processor, the information processing apparatus functions as:
a first obtaining unit configured to obtain first measurement information about a target object sensed by the first sensor with a first position and orientation, wherein the first measurement information is two-dimensional information or three-dimensional information about a target object;

a first measurement unit configured to measure a first three-dimensional position and orientation of the target object based on the first measurement information about the target object;

a sensor position and orientation determination unit configured to determine, based on the first three-dimensional position and orientation of the target object, a second position and orientation of the second sensor which is attached on a movable unit and senses only two-dimensional information, wherein the second sensor is different from the first sensor;

a movable range determination unit configured to determine whether the second position and orientation is within a movable range of the movable unit;

a control unit configured to control the movable unit so that the position and orientation of the second sensor is the second position and orientation in a case where the movable range determination unit determines that the second position and orientation is within a movable range of the movable unit;

a second obtaining unit configured to obtain second measurement information about the target object sensed by the second sensor with the second position and orientation, wherein the second measurement information is two-dimensional information about the target object; and a second measurement unit configured to measure three-dimensional position and orientation of the target object based on the second measurement information sensed by the second sensor with the second position and orientation.

* * * * *